(12) United States Patent
Abhayagunawardhana et al.

(10) Patent No.: US 7,474,714 B2
(45) Date of Patent: Jan. 6, 2009

(54) PHASE/FREQUENCY DETECTOR FOR TRACKING RECEIVERS

(75) Inventors: Chamath Abhayagunawardhana, Portland, OR (US); Dave Dunning, Portland, OR (US); Sanjay Dabral, Palo Alto, CA (US); Ken Drottar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1112 days.

(21) Appl. No.: 10/334,935

(22) Filed: Dec. 31, 2002

(65) Prior Publication Data

US 2004/0125823 A1 Jul. 1, 2004

(51) Int. Cl.
*H04L 27/00* (2006.01)
(52) U.S. Cl. .................. 375/326; 375/355; 375/375
(58) Field of Classification Search ......... 375/354–355, 375/316, 326, 371, 375
See application file for complete search history.

(56) References Cited

U.S. PATENT DOCUMENTS

| | | | | |
|---|---|---|---|---|
| 6,392,457 B1 * | 5/2002 | Ransijn | ........................ | 327/156 |
| 6,600,793 B1 * | 7/2003 | Grundvig et al. | ............ | 375/326 |
| 6,693,985 B2 * | 2/2004 | Li et al. | ........................ | 375/355 |
| 7,113,560 B1 * | 9/2006 | Huang et al. | ................. | 375/355 |
| 7,167,533 B2 * | 1/2007 | Glenn et al. | ................. | 375/371 |
| 7,183,864 B1 * | 2/2007 | Gutnik | ......................... | 331/57 |
| 7,203,260 B2 * | 4/2007 | Moon et al. | ................... | 375/355 |
| 7,221,723 B2 * | 5/2007 | Walker | ........................ | 375/355 |
| 2003/0086339 A1 * | 5/2003 | Dally et al. | .................. | 368/202 |
| 2003/0193423 A1 * | 10/2003 | Ng et al. | ......................... | 341/68 |
| 2004/0022311 A1 * | 2/2004 | Zerbe et al. | .................. | 375/229 |
| 2004/0088594 A1 * | 5/2004 | Canagasaby et al. | ........ | 713/400 |

* cited by examiner

*Primary Examiner*—Chieh M. Fan
*Assistant Examiner*—Freshteh N Aghdam
(74) *Attorney, Agent, or Firm*—Blakely, Sokoloff, Taylor & Zafman LLP

(57) ABSTRACT

A receiving device within a digital electronic system includes a sampling unit, a voter block, and a local clock phase adjustment unit. The sampling unit samples an input line at three points in time at intervals of one half of a bit period. The sampling unit delivers the values obtained in the sampling process to the voter block. The voter block determines whether to deliver an up or a down vote to the local clock phase adjustment unit. The voter block communicates with the local clock phase adjustment unit via up and down control signals. The local clock phase adjustment unit determines whether the local clock phase should be adjusted, and if so, whether to advance or delay the local clock phase. If certain meta-stable conditions are observed by the voter block, the voter block will vote in one direction in order to push the system out of the meta-stable condition.

21 Claims, 2 Drawing Sheets

PHASE/FREQUENCY DETECTOR FOR TRACKING RECEIVERS

FIELD OF THE INVENTION

The present invention pertains to the field of computer systems. More particularly, this invention pertains to the field of detecting clock phase information embedded in data streams.

BACKGROUND OF THE INVENTION

Many digital electronic systems, including computer systems, include more than a single device. The multiple devices within a system may be coupled to each other by way of interconnects. One type of interconnect may be based on serial data delivery from a transmitting device to a receiving device.

The purpose of an interconnect is to transport data reliably from one point to another. For reliable re-construction of data, the timing reference, i.e. clock edge positions, used by the receiving device should resemble the timing references used at the transmitting device.

One of the most commonly used receiver architectures for high-speed serial data transmission is based on recovering a clock embedded in the received data by tracking the phase of that received data. High data rates mean the receiving devices need to operate within shrinking timing windows and therefore requiring accurate phase tracking.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment of a receiving device within a digital electronic system includes a sampling unit, a voter block, and a local clock phase adjustment unit. The sampling unit samples an input line at three points in time at intervals of one half of a bit period. The sampling unit delivers the values obtained in the sampling process to the voter block. The voter block determines whether to deliver an up or a down vote to the local clock phase adjustment unit, the up and down votes depending on the sample values. The voter block communicates with the local clock phase adjustment unit via up and down control signals. The local clock phase adjustment unit determines whether the local clock phase should be adjusted, and if so, whether to advance or delay the local clock phase.

The clock phase adjustment unit may include a programmable threshold level. The clock phase adjustment unit may store up and down votes communicated by the voter block. When the number of up votes outnumbers the number of down votes by at least the threshold value, then the local clock phase adjuster will delay the local clock phase. Similarly, when the number of down votes outnumbers the number of up votes by at least the threshold value, then the local clock phase adjuster will advance the local clock phase.

In one case, the first and third sample values may be equal and the second sample value may differ from the first and third sample values. This case represents a meta-stable condition and may occur during an initial acquisition period. In order to push the system out of the meta-stable condition, the voter block will deliver an up vote to the local clock phase adjuster. A number of up votes will cause the local clock phase adjuster unit to delay the local clock phase. Another embodiment may have the voter block delivering down votes to the local clock phase adjuster unit in response to the meta-stable condition.

Figure 1:
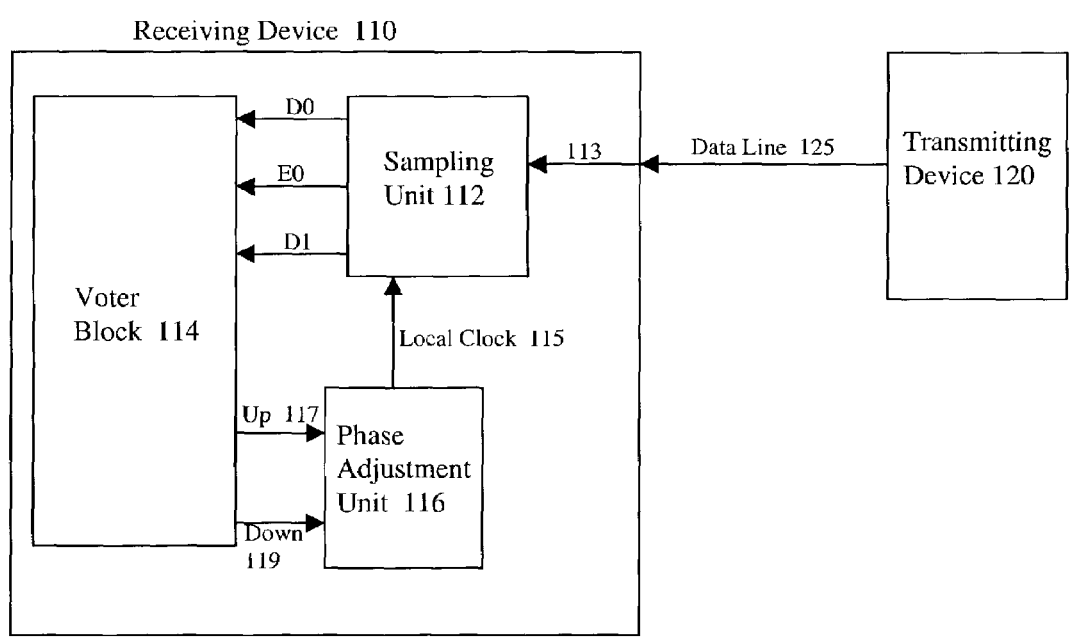
FIG. 1 is a block diagram of a system including a receiving device and a transmitting device. The receiving device includes a voter block.

FIG. 1 is a block diagram of an example system including a receiving device 110 and a transmitting device 120. The receiving device 110 and the transmitting device 120 are coupled by a data line 125. The receiving device includes a sampling unit 112, a voter block 114, and a phase adjustment unit 116. The sampling unit 112 receives input from the data line 125 via an input signal 113. For this example embodiment, the data line 125 is part of a serial interconnect used to couple together the receiving device 110 and the transmitting device 120. The sampling unit 112 is coupled to the voter block 114 via a D0 signal, an E0 signal, and a D1 signal. The voter block 114 communicates with the phase adjustment unit 116 using an up signal 117 and a down signal 119. A local clock signal 115 is provided to the sampling unit by the phase adjustment unit 116.

The sampling unit 112 samples the input line 113 every one half bit period. Three sample values are delivered to the voter block via the D0, E0, and D1 signals. The D0 signal represents a first sample value, the E0 signal represents a second value sampled one half bit period following the first sample, and the D1 signal represents a third value sampled one half bit following the second sample. The voter block 114 receives the D0, E0, and D1 signals and determines whether to deliver an up vote, a down vote, or no vote to the phase adjustment unit 116. The voter block 114 makes determinations on how to vote according to Table 1, below.

TABLE 1

| Input | | | Output | |
| --- | --- | --- | --- | --- |
| D0 | E0 | D1 | Up | Down |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 0 | 1 |
| 1 | 0 | 1 | 1 | 0 |
| 1 | 1 | 0 | 1 | 0 |
| 1 | 1 | 1 | 0 | 0 |

The basis for the described algorithm is as follows. If there was a transition of the input line 113 during a two bit window, then D0 will be different from D1. In such a case the value of E0 determines if the local clock 115 used for sampling is either leading or lagging with respect to the observed transition. The situations where D0 equals D1 but D0 and D1 are not equal to E0 represent meta-stable conditions that may occur during an initialization period. In this example embodiment, the voter block 114 will deliver "up" votes to the phase adjustment unit 116 in order to push the system out of the meta-stable condition.

Figure 2:
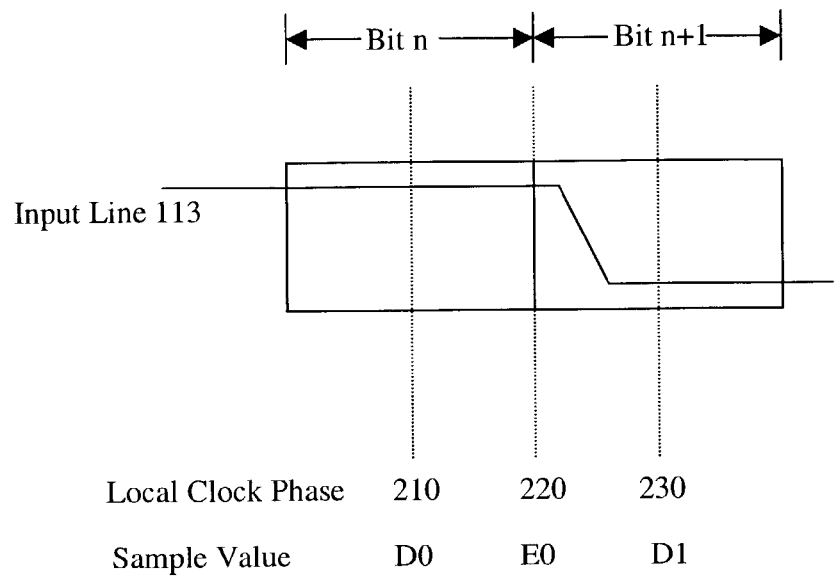
FIG. 2 is a timing diagram showing a transition on an input line where the transition falls within a bit period n+1. The timing diagram also shows several sampling points and their relation to the input line transition.

FIG. 2 is a timing diagram showing a transition on the input line 113 where the transition falls within a bit period n+1. Local clock 115 phases are labeled 210, 220, and 230. The interval between the phase 210 and the phase 220 and between 220 and 230 is one half bit period.

During bit period n, the input line 113 is sampled at time 210. The sample value D0 in this case has a value of "1". A second sample of the input line 113 is taken at time 220. The sample value E0 in this case has a value of "1" because the input line 113 transition has not yet taken place. During bit period n+1, the input line 113 is sampled at time 230. The input line 113 is now observed to have transitioned and the sample value D1 has a value of "0". According to Table 1, for the case where D0=1, E0=1, and D1=0, the voter block 114 will assert the up signal 117 indicating to the phase adjustment unit 116 that for the most recent transition the local clock phase lead the data transition edge.

Figure 3:
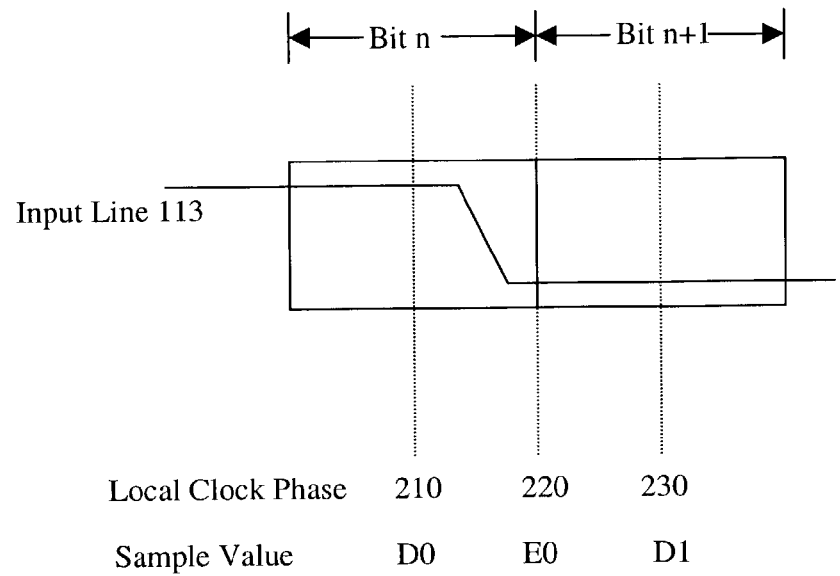
FIG. 3 is a timing diagram showing a transition on an input line where the transition falls within a bit period n. The timing diagram also shows several sampling points and their relation to the input line transition.

FIG. 3 is a timing diagram showing a transition on the input line 113 where the transition falls within a bit period n. During bit period n, the input line 113 is sampled at time 210. The sample value D0 in this case has a value of "1". A second sample of the input line 113 is taken at time 220. The sample value E0 in this case has a value of "0" because the input line 113 transition has taken place. During bit period n+1, the input line 113 is sampled at time 230. The input line 113 is again observed to be at a logically low level and the sample value D1 has a value of "0". According to Table 1, for the case where D0=1, E0=0, and D1=0, the voter block 114 will assert the down signal 119 indicating to the phase adjustment unit 116 that for the most recent transition the local clock phase lagged the data transition edge.

The phase adjustment unit 116 may include a programmable threshold level. The phase adjustment unit 116 may track up and down votes communicated by the voter block. When the number of up votes outnumbers the number of down votes by at least the threshold value, then the phase adjustment unit 116 will delay the local clock 115 phase. Similarly, when the number of down votes outnumbers the number of up votes by at least the threshold value, then the phase adjustment unit will advance the local clock phase.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
    a local dock signal;
    a sampling unit to sample an input line at three points in time, the sampling operations to determine a value for the input line at a first point in time, a value for the input line at a second point in time after the first point in time, and a value for the input line at a third point in time after the second point in time; and
    a voter block to cause the local clock signal phase to be adjusted if the values for the first and third points in time are equal and if the value for the second point in time is not equal to the values for the first and third points in time, and the voter block to cause the local clock signal phase to be advanced if the values for the first and third points in time are not equal and if the value for the second point in time is equal to the value for the third point in time.

2. The apparatus of claim 1, the voter block to cause the local clock signal phase to be delayed if the values for the first and third points in time are not equal and if the value for the second point in time is equal to the value for the first point in time.

3. The apparatus of claim 2, the voter block to cause the local clock phase to not be adjusted if the values for the first, second, and third points in time are equal.

4. The apparatus of claim 3, the voter block to cause the local clock signal phase to be advanced if the values for the first and third points in time are not equal and if the value for the second point in time is equal to the value for the third point in time by asserting a down control signal.

5. The apparatus of claim 4, the voter block to cause the local clock signal phase to be delayed if the values for the first and third points in time are not equal and if the value for the second point in time is equal to the value for the first point in time by asserting an up control signal.

6. The apparatus of claim 5, the voter block to cause the local clock signal phase to be delayed includes by asserting an up control signal if the values for the first and third points in time are equal and if the value for the second point in time is not equal to the values for the first and third points in time.

7. The apparatus of claim 6, the first, second, third points in time occurring at intervals equal to one half of a bit period.

8. A method, comprising:
    sampling an input line at three points in time, the sampling operations to determine a value for the input line at a first point in time, a value for the input line at a second point in time after the first point in time, and a value for the input line at a third point in time after the second point in time;
    causing a local clock signal phase to be adjusted if the values for the first and third points in time are equal and if the value for the second point in time is not equal to the values for the first and third points in time; and
    causing the local clock signal phase to be advanced if the values for the first and third points in time are not equal and if the value for the second point in time is equal to the value for the third point in time.

9. The method of claim 8, further comprising to causing the local clock signal phase to be delayed if the values for the first and third points in time are not equal and if the value for the second point in time is equal to the value for the first point in time.

10. The method of claim 9, further comprising causing the local clock phase to not be adjusted if the values for the first, second, and third points in time are equal.

11. The method of claim 10, wherein causing the local clock signal phase to be advanced if the values for the first and third points in time are not equal and if the value for the second point in time is equal to the value for the third point in time includes asserting a down control signal.

12. The method of claim 11, wherein causing the local clock signal phase to be delayed if the values for the first and third points in time are not equal and if the value for the second point in time is equal to the value for the first point in time includes asserting an up control signal.

13. The method of claim 12, wherein causing the local clock signal phase to be adjusted if the values for the first and third points in time are equal and if the value for the second point in time is not equal to the values for the first and third points in time includes delaying the local clock signal phase by asserting an up control signal.

14. The method of claim 13, wherein sampling the input line at three points in time includes sampling the input line at the first, second, and third points in time occurring at intervals equal to one half of a bit period.

15. A system, comprising:
a transmitting device; and
a receiving device including an input line, the receiving device connected to the transmitting device by a data line coupled to the input line, the receiving device further including
a local clock signal,
a sampling unit to sample the input line at three points in time, the sampling operations to determine a value for the input line at a first point in time, a value for the input line at a second point in time after the first point in time, and a value for the input line at a third point in time after the second point in time, and
a voter block to cause the local clock signal phase to be adjusted if the values for the first and third points in time are equal and if the value for the second point in time is not equal to the values for the first and third points in time, and the voter block to cause the local clock signal phase to be advanced if the values for the first and third points in time are not equal and if the value for the second point in time is equal to the value for the third point in time.

16. The system of claim 15, the voter block to cause the local clock signal phase to be delayed if the values for the first and third points in time are not equal and if the value for the second point in time is equal to the value for the first point in time.

17. The system of claim 16, the voter block to cause the local clock phase to not be adjusted if the values for the first, second, and third points in time are equal.

18. The system of claim 17, the voter block to cause the local clock signal phase to be advanced if the values for the first and third points in time are not equal and if the value for the second point in time is equal to the value for the third point in time by asserting a down control signal.

19. The system of claim 18, the voter block to cause the local clock signal phase to be delayed if the values for the first and third points in time are not equal and if the value for the second point in time is equal to the value for the first point in time by asserting an up control signal.

20. The system of claim 19, the voter block to cause the local clock signal phase to be delayed includes by asserting an up control signal if the values for the first and third points in time are equal and if the value for the second point in time is not equal to the values for the first and third points in time.

21. The system of claim 20, the first, second, third points in time occurring at intervals equal to one half of a bit period.

* * * * *